US009720955B1

(12) United States Patent
Cao et al.

(10) Patent No.: US 9,720,955 B1
(45) Date of Patent: Aug. 1, 2017

(54) SEARCH QUERY PREDICTIONS BY A KEYBOARD

(71) Applicant: Google Inc., Mountain View, CA (US)

(72) Inventors: Jing Cao, Mountain View, CA (US); Alexa Greenberg, San Francisco, CA (US); Abhanshu Sharma, Mountain View, CA (US); Yanchao Su, Mountain View, CA (US); Nicholas Kong, San Francisco, CA (US); Muhammad Mohsin, Santa Clara, CA (US); Jacek Jurewicz, Zurich (CH); Wei Huang, Clyde Hill, WA (US); Matthew Sharifi, Kilchberg (CH); Benjamin Sidhom, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/289,661

(22) Filed: Oct. 10, 2016

Related U.S. Application Data

(63) Continuation of application No. 15/133,291, filed on Apr. 20, 2016.

(51) Int. Cl.
  *G06F 3/00* (2006.01)
  *G06F 17/30* (2006.01)
  (Continued)

(52) U.S. Cl.
  CPC .... *G06F 17/30398* (2013.01); *G06F 3/04886* (2013.01); *G06F 17/30554* (2013.01); *G06F 17/30973* (2013.01); *G06F 3/0482* (2013.01)

(58) Field of Classification Search
  CPC .. G06F 3/04817; G06F 3/0481; G06F 9/4443; G06Q 10/10; H04L 12/581
  (Continued)

(56) References Cited

U.S. PATENT DOCUMENTS 6,104,397 A * 8/2000 Ryan ................... G06F 3/04817
                                                      715/846
8,745,018 B1   6/2014 Singleton et al.
(Continued)

FOREIGN PATENT DOCUMENTS

EP           2940605 A1   11/2015

OTHER PUBLICATIONS

U.S. Appl. No. 15/299,027, by Ming-sang Choi, filed Oct. 20, 2016.
(Continued)

*Primary Examiner* — Haoshian Shih
(74) *Attorney, Agent, or Firm* — Shumaker & Sieffert, P.A.

(57) ABSTRACT

A computing device is described that includes at least one processor and a memory including instructions that when executed cause the at least one processor to output, for display, a graphical keyboard comprising a plurality of keys, and determine, based on an indication of a selection of one or more keys from the plurality of keys, text of an electronic communication. The instructions, when executed, further cause the at least one processor to identify, based at least in part on the text, a searchable entity or trigger phrase, generate, based on the searchable entity or trigger phrase, a search query, and output, for display, within the graphical keyboard, a graphical indication to indicate that the computing device generated the search query.

20 Claims, 8 Drawing Sheets

(51) Int. Cl.
*G06F 3/0488* (2013.01)
*G06F 3/0482* (2013.01)

(58) Field of Classification Search
USPC .................. 715/758, 764, 772; 709/206
See application file for complete search history.

(56) References Cited

U.S. PATENT DOCUMENTS

| | | |
|---|---|---|
| 9,086,775 B1 | 7/2015 | Tse et al. |
| 2006/0048076 A1 | 3/2006 | Vronay et al. |
| 2006/0294189 A1* | 12/2006 | Natarajan ......... G06F 17/30864 709/206 |
| 2007/0088686 A1 | 4/2007 | Hurst-Hiller et al. |
| 2007/0300177 A1 | 12/2007 | Karas et al. |
| 2008/0201434 A1* | 8/2008 | Holmes ................. G06Q 10/10 709/206 |
| 2011/0191321 A1* | 8/2011 | Gade ....................... G06F 12/08 715/760 |
| 2011/0201387 A1 | 8/2011 | Paek et al. |
| 2011/0221678 A1 | 9/2011 | Davydov |
| 2012/0036469 A1 | 2/2012 | Suraqui |
| 2012/0102549 A1 | 4/2012 | Mazzaferri et al. |
| 2012/0124071 A1 | 5/2012 | Gebhard et al. |
| 2012/0124519 A1 | 5/2012 | Uphoff et al. |
| 2013/0246913 A1 | 9/2013 | McCormack et al. |
| 2014/0115070 A1 | 4/2014 | Virtanen et al. |
| 2014/0172814 A1 | 6/2014 | Yuen et al. |
| 2014/0201676 A1 | 7/2014 | Du et al. |
| 2014/0223372 A1 | 8/2014 | Dostie et al. |
| 2014/0229847 A1 | 8/2014 | Park |
| 2014/0282136 A1 | 9/2014 | Marantz et al. |
| 2014/0282203 A1 | 9/2014 | Pasquero et al. |
| 2015/0006505 A1 | 1/2015 | Plakhov et al. |
| 2015/0121286 A1 | 4/2015 | Kim et al. |
| 2015/0201065 A1 | 7/2015 | Shim et al. |
| 2015/0242086 A1 | 8/2015 | Mindlin |
| 2015/0317316 A1 | 11/2015 | Ghanekar et al. |
| 2015/0331605 A1 | 11/2015 | Park et al. |
| 2015/0370434 A1 | 12/2015 | Kritt et al. |
| 2016/0006856 A1 | 1/2016 | Bruno |
| 2016/0034977 A1 | 2/2016 | Bhaowal et al. |
| 2016/0124926 A1 | 5/2016 | Fallah |
| 2016/0334988 A1 | 11/2016 | Kim et al. |
| 2017/0102870 A1 | 4/2017 | Won |

OTHER PUBLICATIONS

Chansanchai, "Hub Keyboard app from Microsoft Garage makes it easy to multitask from one mobile screen", retrieved from the Internet: <https://blogs.microsoft.com/firehose/2016/02/23/hub-keyboard-app-from-microsoft-garage-makes-it-easy-to-multitask-from-one-mobile-screen/#sm.0001ekq05s8cid6jpo52ovcbjyjie>, Feb. 23, 2016, 6 pp.
U.S. Appl. No. 15/134,319, by Heather Luipold, filed Apr. 20, 2016.
U.S. Appl. No. 15/134,243, by Muhammad Mohsin, filed Apr. 20, 2016.
U.S. Appl. No. 15/134,029, by Ming-sang Choi, filed Apr. 20, 2016.
U.S. Appl. No. 15/134,323, by Jens Nagel, filed Apr. 20, 2016.
U.S. Appl. No. 15/133,291 by Jing Cao, filed Apr. 20, 2016.
U.S. Appl. No. 15/246,091, by Nicholas Chi-Yuen Kong, filed Aug. 24, 2016.
Whitwam, "Microsoft Hub Keyboard Comes to Android With All Things Microsoft in Tow", retrieved from http://www.androidpolice.com/2016/02/23/microsoft-hub-keyboard-comes-to-android-with-all-things-microsoft-in-tow/, Feb. 23, 2016, 5 pp.
Mcalone, "Slash is the best iPhone Keyboard—Business Insider," retrieved from http://www.businessinsider.com/slash-is-the-best-iphone-keyboard-2015-9, Sep. 22, 2015, 26 pp.
U.S. Appl. No. 15/134,029 by Min-sang Choi, filed Apr. 20, 2016.
U.S. Appl. No. 15/332,513, by Heather Luipold, filed Oct. 24, 2016.
U.S. Appl. No. 15/332,409, by Muhammad Mohsin et al., filed Oct. 24, 2016.
U.S. Appl. No. 15/383,753, by Alexa Greenberg et al., filed Dec. 19, 2016.
Invitation to Restrict or Pay Additional Fees from International Application No. PCT/US2016/069159, dated Apr. 3, 2017, 8 pp.

* cited by examiner

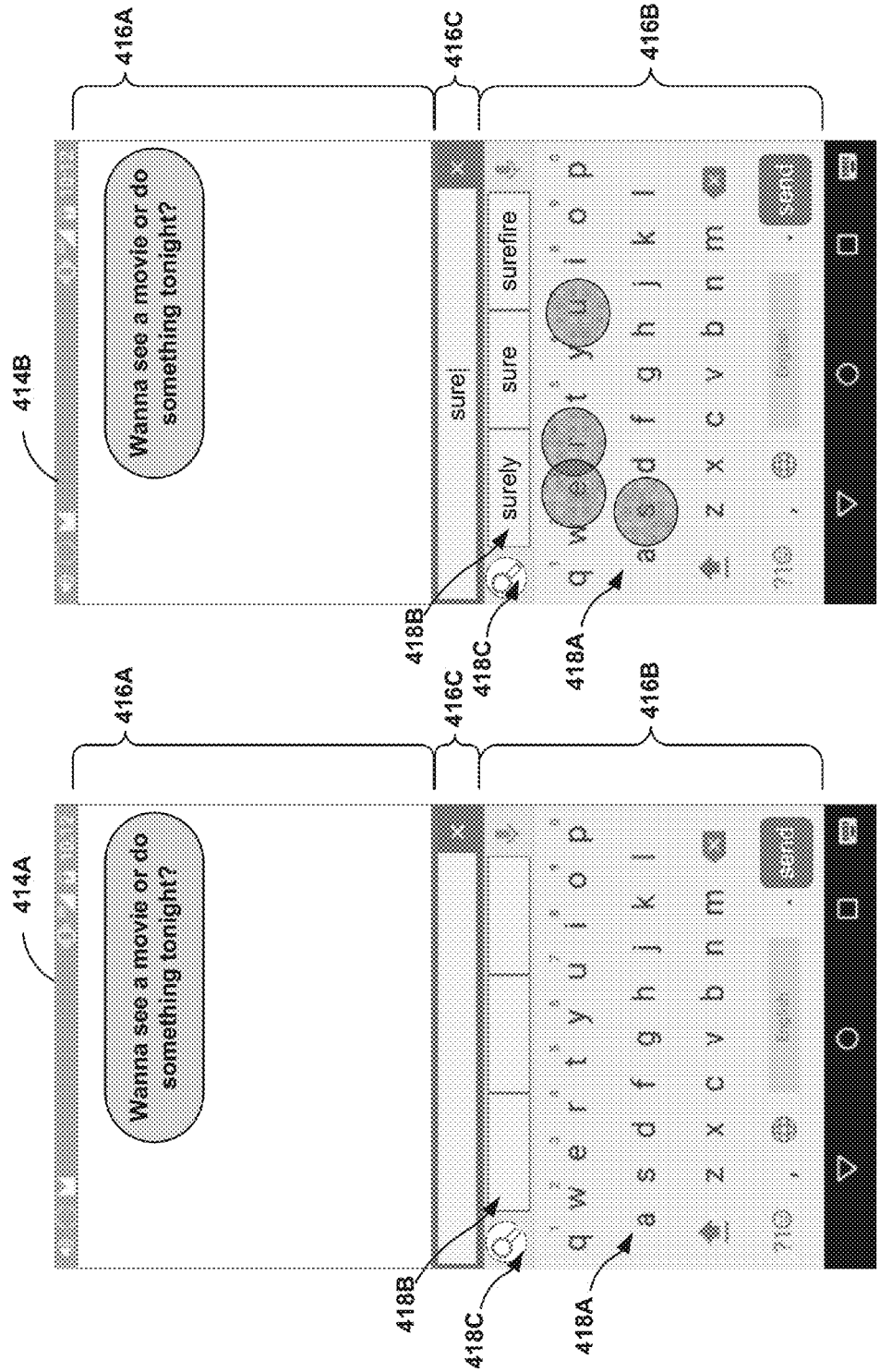

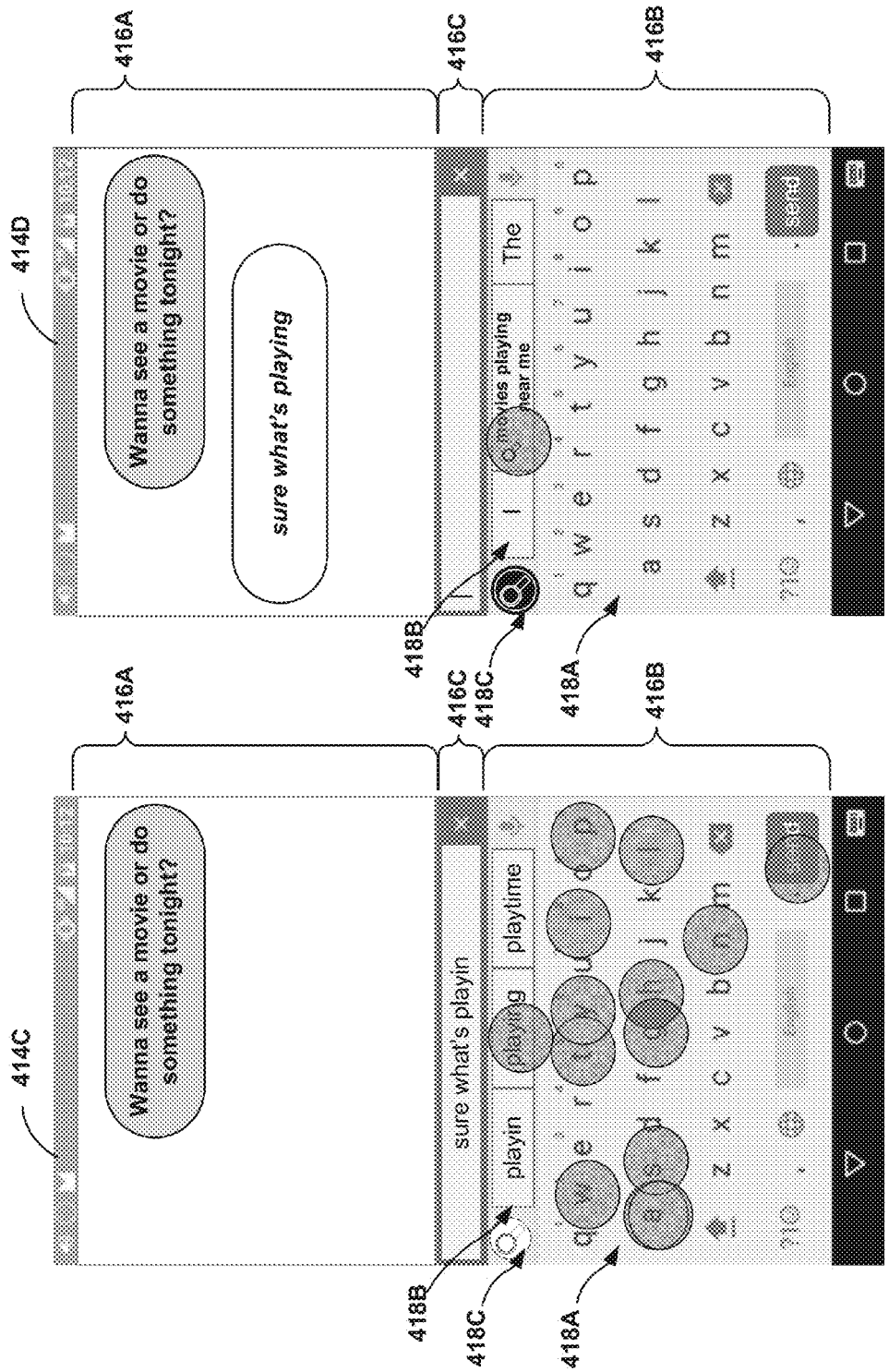

SEARCH QUERY PREDICTIONS BY A KEYBOARD

RELATED APPLICATION

This application is a continuation of U.S. application Ser. No. 15/133,291, filed Apr. 20, 2016, the entire contents of which are hereby incorporated by reference.

BACKGROUND

Despite being able to simultaneously execute several applications, some mobile computing devices can only present a graphical user interface (GUI) of a single application, at a time. To interact with multiple applications at once, a user of a mobile computing device may have to provide input to switch between different application GUIs to complete a particular task. For example, a user of a mobile computing device may have to cease entering text in a messaging application, provide input to cause the device to toggle to a search application, and provide yet additional input at a GUI of the search application to search for a particular piece of information that the user may need to finish composing a message or otherwise entering text in the messaging application. Providing several inputs required by some computing devices to perform various tasks can be tedious, repetitive, and time consuming.

SUMMARY

In one example, a method includes outputting, by a keyboard application executing at a computing device, for display, a graphical keyboard comprising a plurality of keys, determining, by the keyboard application, based on an indication of a selection of one or more keys from the plurality of keys, text of an electronic communication, and identifying, by the keyboard application, based at least in part on the text, a searchable entity. The method further includes generating, by the keyboard application, based on the searchable entity, a search query, and outputting, by the keyboard application, for display within the graphical keyboard, a graphical indication to indicate that the computing device generated the search query.

In another example, a mobile device includes a presence-sensitive display component, at least one processor, and a memory that stores instructions associated with a keyboard application. The instructions, when executed, cause the at least one processor to output, for display at the presence-sensitive display component, a graphical keyboard comprising a plurality of keys, determine, based on an indication of a selection of one or more keys from the plurality of keys detected at the presence-sensitive display component, text of an electronic communication, and identify, based at least in part on the text, a trigger phrase. The instructions, when executed, further cause the at least one processor to generate, based on the trigger phrase, a search query, and output, for display, at the presence-sensitive display component and within the graphical keyboard, a graphical indication to indicate that the computing device generated the search query.

In another example, a method is described that includes invoking, by a first application executing at a computing device, for receiving text input, a keyboard application that is configured to provide a graphical keyboard comprising a plurality of keys, determining, by the keyboard application, based on an indication of a selection of one or more keys from the plurality of keys, the text input; identifying, by the keyboard application, based at least in part on the text input, a searchable entity, and generating, by the keyboard application, based on the searchable entity, a search query. The method further includes outputting, by the keyboard application, for display within the graphical keyboard, a graphical indication to indicate that the keyboard application generated the search query, and responsive to receiving, by the keyboard application, an indication of a selection of the search query, initiating, by the keyboard application, at a search application, a search based on the search query.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4E are conceptual diagrams illustrating example graphical user interfaces of an example computing device that is configured to present a graphical keyboard with integrated search features, in accordance with one or more aspects of the present disclosure.

DETAILED DESCRIPTION

Figure 1:
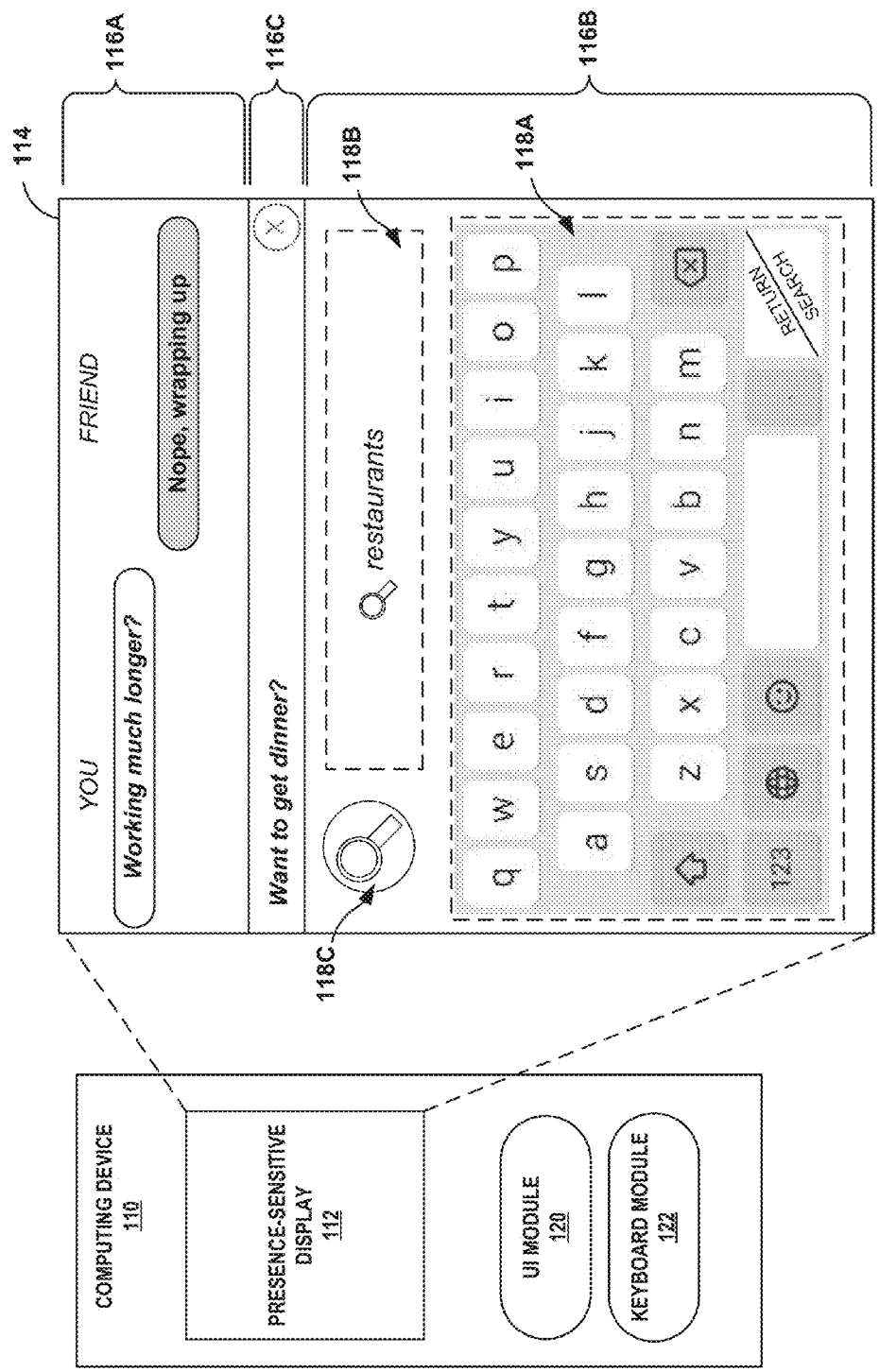
FIG. 1 is a conceptual diagram illustrating an example computing device that is configured to present a graphical keyboard with integrated search features, in accordance with one or more aspects of the present disclosure.

In general, this disclosure is directed to techniques for enabling a computing device to automatically predict search queries based on text being entered with a graphical keyboard and display the predicted queries within the graphical keyboard. In various instances, the techniques may also enable the computing device to execute a search based on the displayed queries to obtain, from directly within the graphical keyboard, search results that may be relevant to the text entered using the graphical keyboard. For example, a user may interact with a graphical keyboard that is presented, by a keyboard application, at a presence-sensitive screen (e.g., a touchscreen). The interaction may be in association with a communication application or the like, distinct from a search application, for example as part of a messaging or texting application graphical user interface (GUI). As the computing device detects input associated with the graphical keyboard (e.g., as the user types a message), the graphical keyboard application may determine words from the input and identify searchable entities, terms or trigger phrases based on the words. The keyboard application may automatically generate and display a suggested search query for obtaining additional information related to one or more of the searchable entities, terms or trigger phrases. If the user is interested in conducting a search based on the displayed query, the user may select the suggested search query and cause the keyboard application to initiate the search (which may optionally be performed on the content stored on the computing device and/or by a search engine on content stored remote of the computing device). In some examples, the computing device may present the search results as part of or in place of a portion of the keyboard (e.g., in place of the graphical keys) within or by the keyboard application.

By providing a GUI that includes a graphical keyboard with integrated search query prediction, an example computing device may provide a way for a user to quickly obtain search results that are relevant to the input that the user has already provided at the graphical keyboard without having to switch between several different applications and application GUIs, re-type text already input at the graphical keyboard, or come up with a relevant search query on his or her own. In this way, techniques of this disclosure may reduce the amount of time and the number of user inputs required to obtain search results, which may simplify the user experience and may reduce power consumption of the computing device.

Throughout the disclosure, examples are described where an application, a computing device and/or a computing system analyzes information (e.g., text being entered at a graphical keyboard, context, locations, speeds, search queries, etc.) associated with a computing device and a user of a computing device, only if the user of the computing device provides permission to analyze the information. For example, in situations discussed below, before an application, computing device or computing system can collect or may make use of information associated with a user, the user may be provided with an opportunity to provide input to control whether the application, computing device and/or computing system can collect and make use of user information (e.g., information about text being entered at a graphical keyboard, etc.), or to dictate whether and/or how to the application, device and/or system may receive content that may be relevant to the user. In addition, certain data may be treated in one or more ways before it is stored or used by the application, computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an example computing device 110 that is configured to present a graphical keyboard with integrated search features, in accordance with one or more aspects of the present disclosure. Computing device 110 may represent a mobile device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, or any other types of wearable and non-wearable, mobile or non-mobile computing devices that may output a graphical keyboard for display.

Computing device 110 includes a presence-sensitive display (PSD) 112, user interface (UI) module 120 and keyboard module 122. Modules 120 and 122 may perform operations described using software, hardware, firmware, or a mixture of hardware, software, and firmware residing in and/or executing at computing device 110. One or more processors of computing device 110 may execute instructions that are stored at a memory or other non-transitory storage medium of computing device 110 to perform the operations of modules 120 and 122. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interface 114 which, as shown in FIG. 1, is a graphical user interface of a chat application executing at computing device 110 and includes various graphical elements displayed at various locations of PSD 112.

As shown in FIG. 1, user interface 114 is a chat user interface. However, user interface 114 may be any graphical user interface which includes a graphical keyboard with integrated search features. User interface 114 includes output region 116A, graphical keyboard 116B, and edit region 116C. A user of computing device 110 may provide input at graphical keyboard 116B to produce textual characters within edit region 116C that form the content of the electronic messages displayed within output region 116A. The messages displayed within output region 116A form a chat conversation between a user of computing device 110 and a user of a different computing device.

UI module 120 manages user interactions with PSD 112 and other components of computing device 110. In other words, UI module 120 may act as an intermediary between various components of computing device 110 to make determinations based on user input detected by PSD 112 and generate output at PSD 112 in response to the user input. UI module 120 may receive instructions from an application, service, platform, or other module of computing device 110 to cause PSD 112 to output a user interface (e.g., user interface 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard having integrated search features including search query prediction and execution. Keyboard module 122 may switch between operating in text-entry mode in which keyboard module 122 functions similar to a traditional graphical keyboard, or search mode in which keyboard module 122 performs various integrated search functions or interfaces with one or more search applications or functionality.

In some examples, keyboard module 122 may be a stand-alone application, service, or module executing at computing device 110 and, in other examples, keyboard module 122 may be a sub-component acting as a service for other applications or device functionality. For example, keyboard module 122 may be integrated into a chat or messaging application executing at computing device 110 whereas, in other examples, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be preloaded during production of computing device 110.

When operating in text-entry mode, keyboard module 122 of computing device 110 may perform traditional, graphical keyboard operations used for text-entry, such as: generating a graphical keyboard layout for display at PSD 112, mapping detected inputs at PSD 112 to selections of graphical keys, determining characters based on selected keys, or predicting or autocorrecting words and/or phrases based on the characters determined from selected keys.

Graphical keyboard 116B includes graphical elements displayed as graphical keys 118A. Keyboard module 122 may output information to UI module 120 that specifies the layout of graphical keyboard 116B within user interface 114. For example, the information may include instructions that specify locations, sizes, colors, and other characteristics of graphical keys 118A. Based on the information received from keyboard module 122, UI module 120 may cause PSD 112 to display graphical keyboard 116B as part of user interface 114.

Each key of graphical keys 118A may be associated with one or more respective characters (e.g., a letter, number, punctuation, or other character) displayed within the key. A user of computing device 110 may provide input at locations of PSD 112 at which one or more graphical keys 118A are displayed to input content (e.g., characters, search results, etc.) into edit region 116C (e.g., for composing messages that are sent and displayed within output region 116A or for inputting a search query that computing device 110 executes from within graphical keyboard 116B). Keyboard module 122 may receive information from UI module 120 indicating locations associated with input detected by PSD 112 that are relative to the locations of each of the graphical keys. Using a spatial and/or language model, keyboard module 122 may translate the inputs to selections of keys and characters, words, and/or phrases.

For example, PSD 112 may detect user inputs as a user of computing device 110 provides the user inputs at or near a location of PSD 112 where PSD 112 presents graphical keys 118A. The user may type at graphical keys 118A to enter the phrase 'want to get dinner?' at edit region 116C. UI module 120 may receive, from PSD 112, an indication of the user input detected by PSD 112 and output, to keyboard module 122, information about the user input. Information about the user input may include an indication of one or more touch events (e.g., locations and other information about the input) detected by PSD 112.

Based on the information received from UI module 120, keyboard module 122 may map detected inputs at PSD 112 to selections of graphical keys 118A, determine characters based on selected keys 118A, and predict or autocorrect words and/or phrases determined based on the characters associated with the selected keys 118A. For example, keyboard module 122 may include a spatial model that may determine, based on the locations of keys 118A and the information about the input, the most likely one or more keys 118A being selected are the keys. Responsive to determining the most likely one or more keys 118A being selected, keyboard module 122 may determine one or more characters, words, and/or phrases. For example, each of the one or more keys 118A being selected from a user input at PSD 112 may represent an individual character or a keyboard operation. Keyboard module 122 may determine a sequence of characters selected based on the one or more selected keys 118A. In some examples, keyboard module 122 may apply a language model to the sequence of characters to determine one or more the most likely candidate letters, morphemes, words, and/or phrases that a user is trying to input based on the selection of keys 118A. In the example of FIG. 1, keyboard module 122 may determine the sequence of characters corresponds to the letters of the phrase 'want to get dinner?'.

Keyboard module 122 may send the sequence of characters and/or candidate words and phrases (e.g., 'want to get dinner?') to UI module 120 and UI module 120 may cause PSD 112 to present the characters and/or candidate words determined from a selection of one or more keys 118A as text within edit region 116C. In some examples, when functioning as a traditional keyboard for performing text-entry operations, and in response to receiving a user input at graphical keys 118A (e.g., as a user is typing at graphical keyboard 116B to enter text within edit region 116C), keyboard module 122 may cause UI module 120 to display the candidate words and/or phrases as one or more selectable spelling corrections and/or selectable word or phrase suggestions within suggestion region 118B.

In addition to performing traditional, graphical keyboard operations used for text-entry, keyboard module 122 of computing device 110 also provides integrated search capability. That is, rather than requiring a user of computing device 110 to navigate away from user interface 114 which provides graphical keyboard 116B (e.g., to a different application or service executing at or accessible from computing device 110), keyboard module 122 may operate in search mode in which keyboard module 122 may execute search operations, predicting and presenting search queries based on text being entered at graphical keyboard 116B, and present search in one ore more possible locations and formats, such as results within the same region of PSD 112 at which graphical keyboard 116B is displayed.

As indicated above, keyboard module 122 may execute as a stand-alone application, service, or module executing at computing device 110 or as a single, integrated sub-component thereof. Therefore, if keyboard module 122 forms part of a chat or messaging application executing at computing device 110, keyboard module 122 may provide the chat or messaging application with text-entry capability as well as search capability. Similarly, if keyboard module 122 is a stand-alone application or subroutine that is invoked by an application or operating platform of computing device 110 any time an application or operating platform requires graphical keyboard input functionality, keyboard module 122 may provide the invoking application or operating platform with text-entry capability as well as search capability.

Keyboard module 122 may further operate in search mode. When operating in search mode, keyboard module 122 may execute various search related functions. For example, keyboard module 122 may perform manual searches (e.g., Boolean, natural language, etc.), generate and display predicted search queries, emoji searches, translations, and other search related features.

In some examples, when operating in search mode, keyboard module 122 may cause graphical keyboard 116B to include search element 118C. Search element 118C represents a selectable element (e.g., an icon, a key, etc.) of graphical keyboard 116B for manually invoking one or more of the various search features of graphical keyboard 116B. For example, by selecting search element 118C (e.g., by tapping or gesturing at a location or within a region of PSD 112 at which search element 118C is displayed), a user can cause computing device 110 to invoke one or more of the various integrated search features without the user having to expressly navigate to a separate application, service, or other feature executing at or accessible from computing device 110.

In some examples, search element 118C may also be used as an indicator of a status associated with a search feature. For instance, if keyboard module 122 predicts a search query that would likely produce search results related to a user's chat conversation, keyboard module 122 may cause search element 118C to flash, pulse, change color, move, or perform some other animation to indicate that the search query was identified.

In some examples, when operating in search mode, keyboard module 122 may automatically execute various search functions whether or not graphical keyboard 116B includes search element 118C. For example, keyboard module 122 may predict a search query, determine a translation, or generate other suggested content based on text keyboard module 122 infers from user input, and display the suggested content within graphical keyboard 16B. For example, keyboard module 122 may configure suggestion region 118B to present suggested content (e.g., predicted search queries, predicted emoticons or so called "emojis", other suggested content, or any other iconographic symbol) as selectable elements within search element 118C instead of, or in addition to, predicted characters, words or phrases or other primarily linguistic information that keyboard module 122 derives from a language model, lexicon, or dictionary. In other words, rather than just providing spelling or word suggestions from a dictionary within suggestion region 118B, computing device 110 may include, within suggestion region 118B, suggested search related content in addition to or in place of suggested linguistic content, that computing device 110 (or other device in conjunction or communication with device 110) determines may assist a user, at a current time (e.g., when providing input related to electronic communications).

When operating in search mode, keyboard module 122 may perform automatic prediction of search queries that may be related to text being input using graphical keyboard 116B at a current time. In other words, keyboard module 122 may enable computing device 110 to provide a way for a user to quickly obtain information, in the form of a suggested search or search results, that are relevant to the input that the user has already provided at graphical keyboard 116B, without having to switch between several different applications or application GUIs, re-type text already input at graphical keyboard 116B, or come up with a relevant search query on his or her own. Keyboard module 122 may automatically generate and display a search query (e.g., at suggestion region 118C). If the user is interested in conducting a search based on the displayed query, the user can optionally provide input at a location of PSD 112 at which the suggested query is displayed to select the search query and cause keyboard module 122 to initiate the search. In some examples, keyboard module 122 may cause UI module 120 and PSD 112 to present the search results in place of a portion of graphical keys 118A.

For example, as shown in FIG. 1, a user of computing device 110 may want to make dinner plans with a friend and may exchange electronic communications (e.g., messages) with the friend from within user interface 114. The user may begin the conversation by providing gesture input at locations of PSD 112 at which keys 118A are displayed and a spatial and/or language model of keyboard module 122 may determine, based on the input, that the gesture input corresponds to a selection of keys 118A for entering the phrase 'Working much longer?'. The user may provide input at a location of the return key of keys 118A and in response, the messaging application associated with user interface 114 may send an electronic communication to a computing device associate with the friend that includes the text 'Working much longer?'. After receiving a reply message from the computing device associated with the friend that includes the text 'Nope, wrapping up', the messaging application may present the text of the reply within user interface 114.

In some examples, keyboard module 122 may initiate a local device-only search for information stored at computing device 110 without accessing a remote computing device, such as a server. For example, keyboard module 122 may itself perform, or may invoke a locally stored search module, that executes for information stored by computing device 110.

In some examples, keyboard module 122 may conduct a search. And in some examples, keyboard module 122 may rely on a separate device resource or remote resource to complete the search. For example, keyboard module 122 may send a query to an internal search module executing at computing device 110 with an instruction to perform a search. And in some examples, keyboard module 122 may send the query to an external search module executing at a remote computing device, such as a server, with the instruction to perform the search. In either case, the internal or external search module may return search results to keyboard module 122.

The user of computing device 110 may provide further input at locations of PSD 112 at which graphical keyboard 116B is displayed to select one or more keys 118A for composing a second message to the friend that states 'Want to get dinner?'. Keyboard module 122 may receive an indication (e.g., one or more touch events) of the selection of one or more keys 118A from UI module 120.

Based on the indication of the selection of one or more keys 118A, keyboard module 122 may determine text of an electronic communication. For example, a spatial and/or language model of keyboard module 122 may translate the individual key selections associated with the input to a string or sequence of textual characters and/or words representing the phrase 'Want to get dinner?'.

Keyboard module 122 may identify, based at least in part on the text, a "searchable entity" or "trigger phrase" from which keyboard module 122 may generate a search query. The term "searchable entity" generally refers to any descriptor word or phrase or name that a user may type in a sentence that could be used as the basis for a search. Some examples of search entities include the names of professional sports team, actors and other celebrities, politicians, brands, movies, restaurants, landmarks, locations, or any other event, attraction, or thing that could potentially be searched. The term "trigger phrase" generally refers common phrases that people use when discussing a searchable entity, without actually naming the searchable entity. For example, people might use the trigger phrase "lets get dinner" or simply "dinner" rather than mention an exact restaurant or the desire to find a restaurant. Or people might use the trigger phrase "what's the score of the football game" rather than mention a specific team name.

Keyboard module 122 may rely on various "on-device" annotators or text analysis engines that parse and analyze text being input at graphical keyboard 116B to detect if a user has typed something at graphical keyboard 116B that is searchable. The annotators of keyboard module 122 may execute locally at one or more processors of computing device 110, unlike other traditional search systems that may rely on remote annotators executing at a remote computing system (e.g., a server). By relying on on-device annotators, keyboard module 122 may perform search query predictions in seemingly near real-time so as to avoid interrupting or falling behind in a text conversation that a user may be having when typing at graphical keyboard 116B.

In some examples, keyboard module 122 may perform search query predictions by relying on off-device or remote annotators in addition to, or alternative to using on-device annotators. For example, keyboard module 122 may access a cloud service for obtaining search query predictions by sending text inferred by graphical keyboard 116B and/or other information about computing device 110 to the cloud, and in response, receiving one or more relevant search queries.

The annotators of keyboard module 122 may parse text being entered at graphical keyboard 116B so as to detect searchable entities and trigger phrases, using both global and local models. Keyboard module 122 may include in the models those entities and trigger phrases that would likely be relevant or appear most frequently in chat or text messaging conversation. Keyboard module 122 may provide text inferred from user input at graphical keyboard 116B into a local and/or global model and receive as output from the model(s), one or more searchable entities.

The global models may enable the annotators of keyboard module 122 to identify potentially useful search entities that are common across various geolocations (e.g., international brands and celebrities). The local models may enable the annotators of keyboard module 122 to identify potentially useful search entities that are not as common across various geolocations but are common for specific geolocations (e.g., names of local businesses, local events and attractions, local politicians, etc.).

Keyboard module 122 may automatically download updated local models in response to the location of computing device changing. As an example, an annotator of keyboard module 122 may provide the text discerned from a selection of keys 118A as input into both the on-device global and local models and receive as output from the global and local models an indication (e.g., data) of a searchable entity.

Alternatively, or in addition to the local and global models, the annotators of keyboard module 122 may further rely on artificial intelligence and machine learning techniques to determine with a degree of confidence, whether a user is typing about a searchable entity or trigger phrase. For example, keyboard module 122 may rely on a machine learned model including artificial neural networks, recurrent neural networks, long short-term memory (LSTM) models, Hidden Markov Models or any and all other types of machine learned type models that uses learned rules to determine with a degree of certainty whether text being input at graphical keyboard 116B is related to a searchable entity or trigger phrase. For example, in the case of a LSTM model, the LSTM model may initially be trained on chat conversations of multiple users and multiple devices to detect, with confidence, whether a user is currently typing about a particular, searchable entity or trigger phrase. After identifying a potential searchable entity or trigger phrase using a local and/or global model, an annotator of keyboard module 122 may determine, using an LSTM model, a score assigned to the searchable entity or trigger phrase indicating a probability that the searchable entity or trigger phrase is relevant to the one or more words that the annotator parsed from the original text input. If the score assigned to the searchable entity or trigger phrase satisfies a threshold, keyboard module 122 may use the searchable entity or trigger phrase to generate a query.

In some examples, the local and/or global models may determine an initial score associated with a potential searchable entity or trigger phrase and keyboard module 122 may use an LSTM model to boost or improve the initial score determined from the local and/or global models. For example, the initial score determined by the local and/or global models may be increased or decreased by a LSTM model of keyboard module 122 that has been trained on chat conversations to detect, with confidence that the user is talking about a particular entity. The LSTM model may rely on contextual information of computing device 110 as well (in a chat context) the content of prior messages and subsequent messages to determine with greater confidence than the local or global model alone, whether a user is chatting about a particular searchable entity or trigger phrase.

In addition to identifying searchable entities, the local and/or global models of keyboard module 122 may also suggest curated phrases to use in generating search queries. For example, keyboard module 122 may provide text (e.g., the phrase "want to get dinner?") inferred from user input at graphical keyboard 116B into the local and/or global models and receive as output from the model(s), one or more curated phrases. Keyboard module 122 may input the text into a local model and in response to the local model recognizing the phrase as being a predetermined trigger, keyboard module 122 may receive the curated phrase "Restaurants near me" as output from the local model. In some examples, the annotators of keyboard model 122 may further rely on artificial intelligence and machine learning techniques to determine with a degree of confidence, whether a user is typing about a particular curated phrase. For example, using one or more rules about what other people type in chat conversations for various context, the annotators may generate rules for inferring curated phrases based on text input and a particular context. Using the rules, the annotators may predict with a degree of certainty whether a user is chatting about "restaurants near me", "food nearby", "movies playing at a nearby theater", "directions to a place" or some other curated phrase that may be related the text input. If the degree of certainty (e.g., a probability) satisfies a threshold, keyboard module 122 may use the curated phrase in producing a query.

Keyboard module 122 may generate, based on the searchable entity or trigger phrase, a search query. For example, keyboard module 122 may format the output from the annotators and global and local models into a search query format recognized by a search engine executing at or accessible from keyboard module 122. That is, keyboard module 122 may generate a natural language or Boolean search query based on the search entities(s) and curated phrases identified by the models. In keeping with the example of FIG. 1, keyboard module 122 may identify "restaurants" as a searchable entity or curated phrase associated with the text "Want to get dinner?".

Keyboard module 122 may output, for display within graphical keyboard 116C, a graphical indication to indicate that the computing device generated the search query. For example, keyboard module 122 may cause search element 118C to flash or change format, change shape, change color, move, or perform some other animation to indicate that the search query was identified. In addition, or alternatively, keyboard module 122 may output the text of the generated search query as a blue hyperlink (e.g., underlined or not underlined). For example, as shown in FIG. 1, keyboard module 122 causes UI module 120 to present the search query "restaurants" within suggestion region 118B. As a further indication that keyboard module 122 determined the search query, keyboard module 122 may cause UI module 120 to present an icon associated with the search query. For example, keyboard module 122 may cause UI module 120 to present an icon associated with a category of the search query next to the textual language of the query (e.g., a fork and knife icon next to the word restaurants within suggestion region 118B). Alternatively, example, as shown in FIG. 1, PSD 112 may display a magnifying icon next to the word restaurants within suggestion region 118B—the magnifying icon not being associated with any particular category of query.

After automatically presenting a search query within graphical keyboard 116B, a user may select the search query and cause keyboard module 122 to execute, from within user interface 114, a search based on the query. For instance, a user may provide a tap or swipe gesture at a location of PSD 112 at which suggestion region 118B is displayed and in response to receiving, from UI module 120, an indication of the tap or swipe gesture, keyboard module 122 may execute a search based on the query. Keyboard module 122 may cause UI module 120 to present results of the search within user interface 114 from which, a user may select one or more of the results and enter the information associated with the results into a new electronic message.

By providing a GUI that includes a graphical keyboard with integrated search query prediction, an example computing device may provide a way for a user to quickly obtain search results that are relevant to the input that the user has already provided at the graphical keyboard, without having to switch between several different application GUIs, re-type text already input at the graphical keyboard, or come up with a relevant search query on his or her own. In other words, unlike other computing devices that require a user to exit out of a chat application GUI and provide subsequent text input (e.g., by pasting or re-typing text previously entered at the chat application) at a different search application GUI to search for a topic previously entered at the chat application, the example computing device automatically predicts a search query and executes the search query without requiring the user to provide any additional input beyond what he or she originally typed when typing the original chat message. The search is not limited to the text of the original message, but may be related to the topic of the original message. In this way, techniques of this disclosure may reduce the amount of time and the number of user inputs required to obtain search results related to chat conversations, which may simplify the user experience and may reduce power consumption of the computing device.

Figure 2:
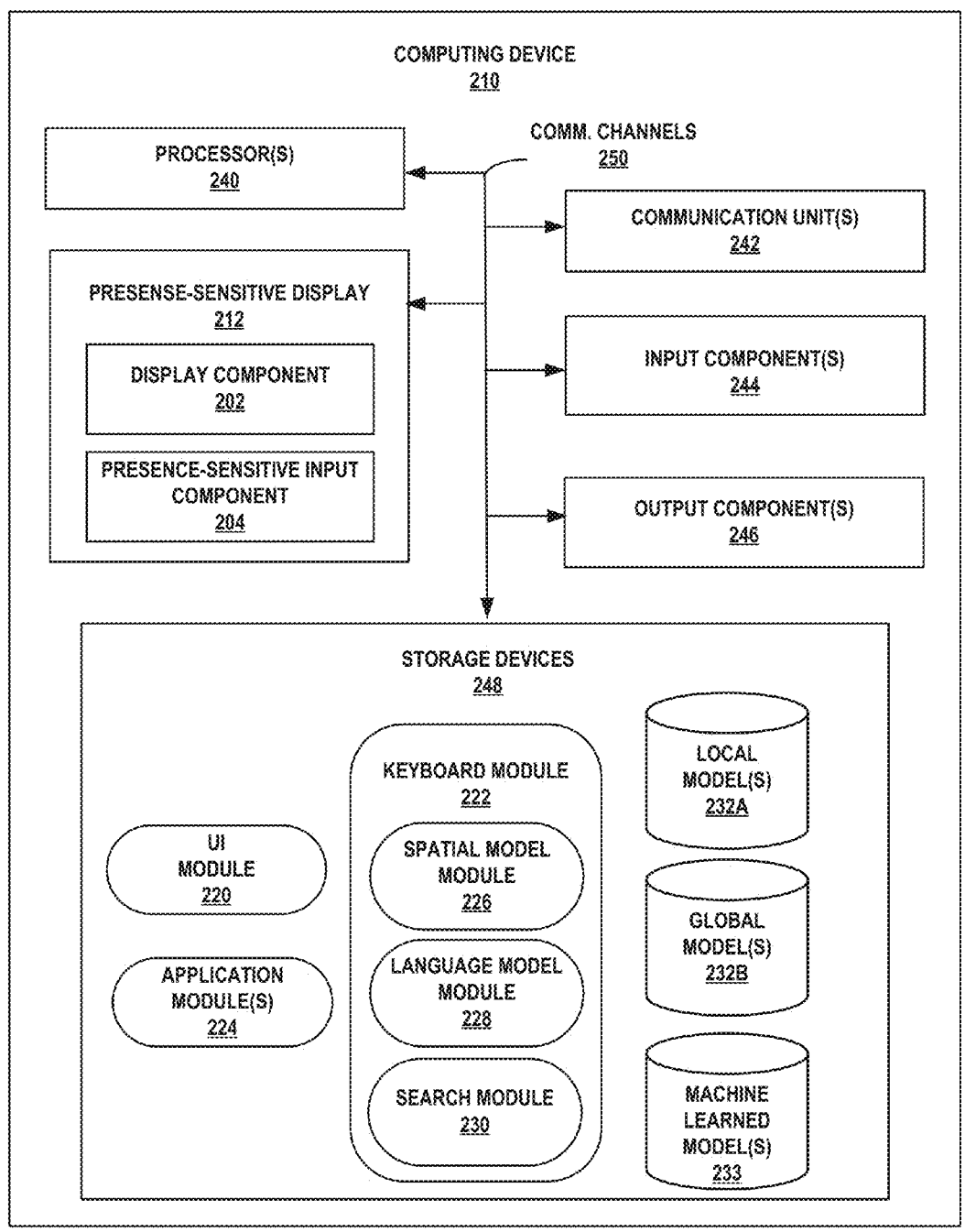
FIG. 2 is a block diagram illustrating an example computing device that is configured to present a graphical keyboard with integrated search features, in accordance with one or more aspects of the present disclosure.

FIG. 2 is a block diagram illustrating computing device 210 as an example computing device that is configured to present a graphical keyboard with integrated search features, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 include UI module 220, keyboard module 222, and one or more application modules 224. Keyboard module 122 may include spatial model ("SM") module 226, language model ("LM") module 228, and search module 230. Storage devices 248 also includes local models 232A and global models 232B (collectively "models 232") as well as machine learned model(s) 233 (e.g., LSTM or other machine learned model). Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 may be similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

While illustrated as an internal component of computing device 210, PSD 212 may also represent an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 and models 232 and 233 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with models 232 and 233 and modules 220, 222, 224, 226, 228, and 230. Storage components 248 may include a memory configured to store data or other information associated with models 232 and 233 and modules 220, 222, 224, 226, 228, and 230.

UI module 220 may include all functionality of UI module 120 of computing device 110 of FIG. 1 and may perform similar operations as UI module 120 for managing a user interface (e.g., user interface 114) that computing device 210 provides at presence-sensitive display 212 for handling input from a user. For example, UI module 220 of computing device 210 may query keyboard module 222 for a keyboard layout (e.g., an English language QWERTY keyboard, etc.). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 22 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIG. 1 and may perform similar operations as keyboard module 122 for providing a graphical keyboard having integrated search features. Keyboard module 222 may include various sub-modules, such as SM module 226, LM module 228, and search module 230, which may perform the functionality of keyboard module 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

When keyboard module 222 operates in text-entry mode, LM module 228 may receive a character or sequence of characters as input, and output one or more candidate characters, words, or phrases that LM module 228 identifies from a lexicon as being potential replacements for a sequence of characters that LM module 228 receives as input for a given language context (e.g., a sentence in a written language). Keyboard module 222 may cause UI module 220 to present one or more of the candidate words at suggestion regions 118C of user interface 114.

The lexicon of computing device 210 may include a list of words within a written language vocabulary (e.g., a dictionary). For instance, the lexicon may include a database of words (e.g., words in a standard dictionary and/or words added to a dictionary by a user or computing device 210). LM module 228 may perform a lookup in the lexicon, of a character string, to identify one or more letters, words, and/or phrases that include parts or all of the characters of the character string. For example, LM module 228 may assign a language model probability or a similarity coefficient (e.g., a Jaccard similarity coefficient, or other similarity coefficient) to one or more candidate words located at a lexicon of computing device 210 that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 228. In response to determining the one or more candidate words, LM module 228 may output the one or more candidate words from lexicon data stores 260A that have the highest similarity coefficients.

Search module 230 of keyboard module 222 may perform integrated search functions on behalf of keyboard module 222. That is, when invoked (e.g., manually in response to a user of computing device 210 selecting selectable element 218C of user interface 114 or automatically in response to identifying a searchable entity or trigger phrase from text input), keyboard module 222 may operate in search mode where keyboard module 222 enables computing device 210 to perform search functions from within graphical keyboard 118A, such as predicting and displaying search queries that a user of computing device 210 may find relevant to a chat conversation.

Models 232 represent multiple "on-device" (e.g., locally stored and executed) models for use by annotators or text analysis engines of search module 230 to parse and analyze text being input at graphical keyboard 116B to detect if a user has typed something at graphical keyboard 116B that is searchable. Models 232 may receive as input, text inferred from user input at graphical keyboard 116B, and output in response, one or more searchable entities or trigger phrases that may be related to portions of the text input. In some examples, models 232 may output a score associated with a searchable entity or trigger phrase as an indication of a probability that the searchable entity or trigger phrase is related to the text input.

By storing and executing models 232 locally, "on-device" (as opposed to "off-device" like other traditional search systems that may rely on remote annotators executing at a remote computing systems), computing device 210 may perform search query predictions in real-time or near real-time so as to avoid interrupting or falling behind in a text conversation that a user may be having when typing at graphical keyboard 116B. In other words, the on-device annotators, used alone or in combination with remote annotators, may enable computing device 210 to determine a search query more quickly as computing device 210 does not have to exchange information with a remote computing device or cloud service that handles the predictions.

Search module 230 may automatically download new local models 232A in response to the location of computing device 210 changing. For example, search model 230 may receive information from one or more of communication units 242 and/or input components 232 (e.g., a GPS receiver) about the current location of computing device 210. Responsive to determining that the current location does not correspond to the location associated with local model 232A, search model 230 may query a remote computing system for a local model for the current location. Upon receiving the local model for the current location from the remote computing system, search model 230 replace the previous local model 232A with a copy of the local model for the current location. In other words, in some examples, search module 230, responsive to determining a change in the current location of computing device 210 from a first location to a second location, may obtain, from a remote computing system, a local model of searchable entities for the second location, and may replace the previous local model 232A with the local model for the second location.

Search module 230 may parse text being entered at graphical keyboard 116B so as to detect searchable entities and trigger phrases, using both global model 232B and local model 232A. For example, LM module 228 may determine, based on at least a portion of the text keyboard module 222 infers from a selection of graphical keys 118, one or more words from a lexicon of LM module 228. Search model 230 may input the one or more words into local model 232A to determine one or more local search entities that local model 232A determines to be relevant to the one or more words. Search module 230 may also obtain, from local model 232A, a respective score assigned to each of the one or more local search entities indicating a probability that the search entity is relevant to the one or more words. In identifying a search entity to use in generating a query. Search module 230 may compare the respective scores associated with the local search entities to a threshold. Responsive to determining the score assigned to a local searchable entity satisfies the threshold, search module 230 may identify the local searchable entity as being suitable for generating a predicted query.

Search model 230 may input the one or more words into global model 232B to determine one or more global search entities that global model 232B determines to be relevant to the one or more words. Search module 230 may also obtain, from global model 232B, a respective score assigned to each of the one or more global search entities indicating a probability that the search entity is relevant to the one or more words. In identifying a search entity to use in generating a query. Search module 230 may compare the respective scores associated with the global search entities to a threshold. Responsive to determining the score assigned to a global searchable entity satisfies the threshold, search module 230 may identify the global searchable entity as being suitable for generating a predicted query.

Search module 230 may select, from amongst the identified global and local search entities, the highest scoring one or more search entities from the local and global models 232. From the highest scoring entities, search module 230 may generate a query.

In addition to identifying searchable entities, local and/or global models 232 used by search module 230 may also suggest curated phrases to use in generating search queries. Search model 230 may determine, based at least in part on the searchable entity or a trigger phrase included in the searchable entity, a curated phrase associated with the searchable entity, and generate, from the curated phrase, the search query. For example, keyboard module 222 may provide text (e.g., the phrase "what time is kickoff") determined from user input at graphical keyboard 116B into the local and/or global models 232 and in response to local model 232A recognizing the text as including text of a predetermined trigger receive as output from model 232, one or more curated phrases, such as "local sports team schedule".

Machine learned models 233 represent "on-device" (e.g., locally stored and executed) LSTM models for use by annotators or text analysis engines of search module 230 to enhance and further refine the determinations made using local and/or global models 232 as to whether a user has typed something at graphical keyboard 116B that is searchable. For example, search module 230 may input the one or more words inferred from user interactions with graphical keyboard 116B into machine learned models 233 to determine refined or updated respective scores assigned to each of the one or more global search entities or local search entities identified by models 232. In this way, machine learned models 233 may improve the confidence computing device 220 has in whether a user is providing input related to a searchable entity.

In some examples, the annotators of search model 230 (e.g., relying on machine learned models 233) may further rely on a current context of computing device 210 to determine a searchable entity and/or curated phrase for use in generating a predicted query. As used herein, a current context specifies the characteristics of the physical and/or virtual environment of a computing device, such as computing device 210, and a user of the computing device, at a particular time. In addition, the term "contextual information" is used to describe any information that can be used by a computing device to define the virtual and/or physical environmental characteristics that the computing device, and the user of the computing device, may experience at a particular time.

Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210.

Machine learned model 233 may rely on contextual information which includes information associated with an electronic conversation that includes the electronic communication that a user may be composing as the user provides input at graphical keyboard 116B, as well as one or more other electronic communications that have been sent or received by computing device 220. For example, keyboard module 222 may modify based on contextual information (e.g., text or other information associated with prior messages sent by computing device 220 and text or other information associated with prior messages received by computing device 220) and from machine learned model 233, a score assigned to a searchable entity by global model 232B or local model 232A. After modifying or refining the score assigned to the searchable entity and responsive to determining the score assigned to the searchable entity satisfies a threshold, keyboard module 222 may identify the searchable entity.

Search module 230 may rely on artificial intelligence and machine learning techniques performed by machine learned models 233 to determine with a degree of confidence, whether a user is typing about a particular curated phrase for a particular context. For example, using one or more rules of machine learned models 233 about what other people type in chat conversations for various context, the annotators of search module 230 may generate rules for inferring curated phrases based on text input and a particular context. Using the rules, the annotators may predict with a degree of certainty whether a user is chatting about "restaurants near me", "food nearby", "movies playing at a nearby theater", "directions to a place" or some other curated phrase that may be related the text input. If the degree of certainty (e.g., a probability) satisfies a threshold, keyboard module 122 may use the curated phrase in producing a query.

Using machine learned models 233, search module 230 may rely on the current context of computing device 210 to settle ambiguity in determining searchable entities. For example, if the text of a chat conversation includes the phrase "what time is kickoff" search module 230 may obtain from global model 232B the names of several professional football teams that are scheduled to play that day. Search model 230 may infer, based on the current location of computing device 210, and using machine learned models 233, that the user is likely referring to the professional team that is associated with a location nearest the current location of computing device 210 as being the professional team which the user is referring.

In addition to relying on the text of a current message being input at computing device 210, machine learned models 233 may enable search module 230 to rely on previous words, sentences, etc. associated with previous messages sent and/or received by computing device 210 to suggest a search query. In other words, using machine learned models 233, search module 230 may rely on the text of an entire conversation including multiple messages that computing device 210 has sent and received to determine a search query that is likely to be relevant to a current conversation.

Figure 3:
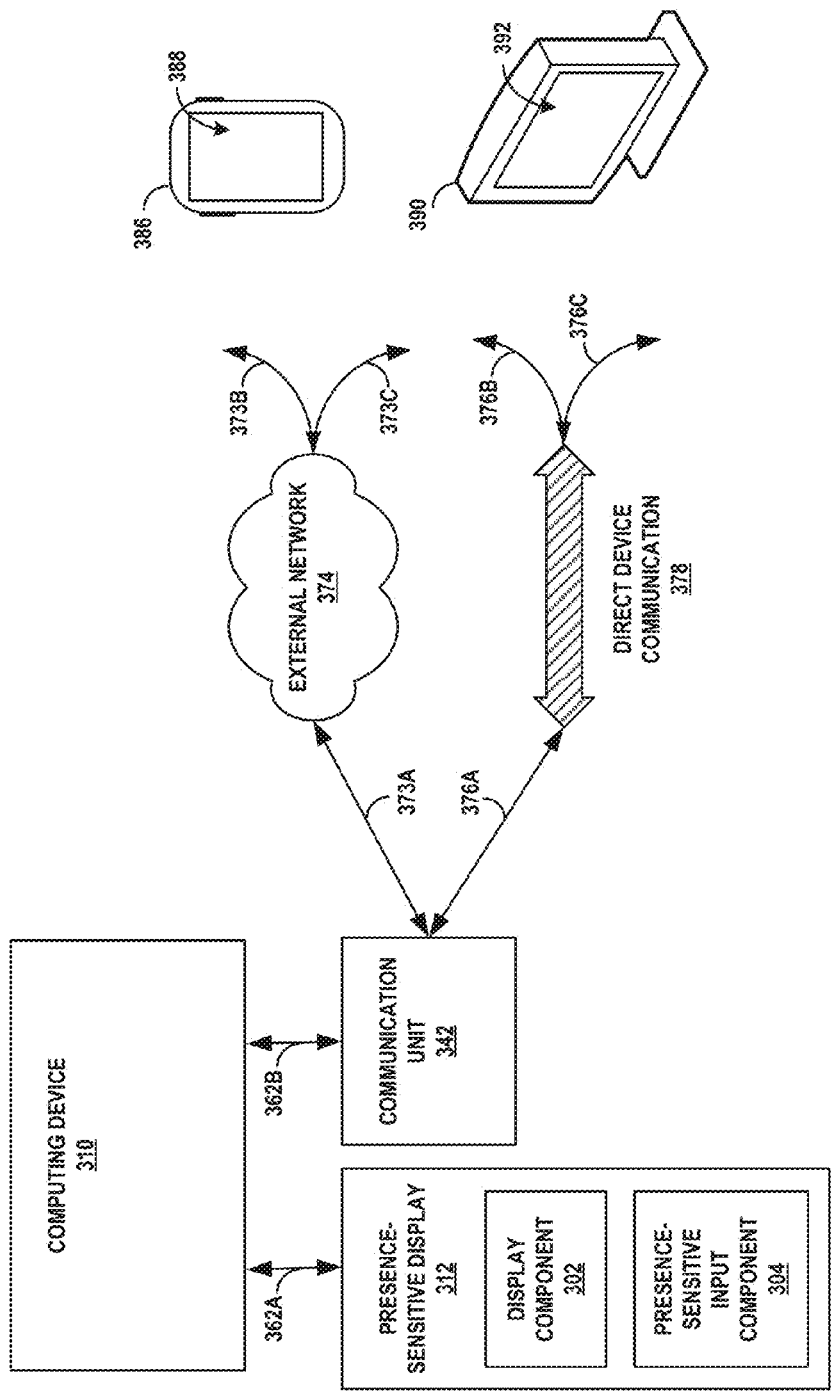
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such mobile device 386 and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as mobile device 386 and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, or 373C. External network 374 may include network hubs, network switches, network routers, etc., that are operatively inter-coupled thereby providing for the exchange of information between computing device 310 and the remote devices illustrated in FIG. 3. In some examples, network links 373A-373C may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376C. In some examples, communication links 376A-376C may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 392. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 392 to output the graphical keyboard. In response to receiving a user input at PSD 392 to select one or more keys of the keyboard, visual display device 130 may send an indication of the user input to computing device 310 using external network 374. Communication unit 342 of may receive the indication of the user input, and send the indication to computing device 310.

Computing device 310 may determine, based on the user input, a selection of one or more keys. Computing device 310 may determine, based on the selection of one or more keys, one or more words. Computing device 310 may identify, based at least in part on the one or more words, a searchable entity and may generate, based on the searchable entity, a search query. Computing device 310 may output, for display within the graphical keyboard, a graphical indication to indicate that the computing device generated the search query. Communication unit 342 may receive the representation of the updated graphical user interface and may send the send the representation to visual display component 390, such that visual display component 390 may cause PSD 392 to output the updated graphical keyboard, including the graphical indication to indicate that the computing device generated the search query.

FIGS. 4A-4E are conceptual diagrams illustrating example graphical user interfaces of an example computing device that is configured to present a graphical keyboard with integrated search features, in accordance with one or more aspects of the present disclosure. FIGS. 4A-4E illustrate, respectively, example graphical user interfaces 414A-414E (collectively, user interfaces 414). However, many other examples of graphical user interfaces may be used in other instances. Each of graphical user interfaces 414 may correspond to a graphical user interface displayed by computing devices 110 or 210 of FIGS. 1 and 2 respectively. FIGS. 4A-4E are described below in the context of computing device 110.

Graphical user interfaces 414 include output region 416A, edit region 416C, and graphical keyboard 416B. Graphical keyboard 416B includes suggestion region 418B, a plurality of keys 418A, and search element 418C.

As shown in FIG. 4A, computing device 110 may receive an electronic communication (e.g., a text message) from a device associated with a friend. Computing device 110 may output the content of the electronic communication for display within output region 416A. The content of the message may include the phrase "Wanna see a movie or do something tonight?"

The user of computing device 110 may interact with graphical keyboard 416B to compose a reply to the message from the friend. As shown in FIG. 4B by semi-transparent circles overlaid on various individual graphical keys 418A (which may or may not be displayed by computing device 110), the user may tap or gesture at one or more keys 418A to type the reply. Keyboard module 122 of computing device 110 may receive an indication of the taps or gestures at keys 418A and determine, based on the user input, text that computing device 110 formats and displays within edit region 416C. For example, as the user types "sure" computing device 110 may cause edit region 416C to display "sure". In addition, as the user types at graphical keys 418A, keyboard module 122 of computing device 110 may predict one or more candidate words based on the user input and display one or more of the candidate words within suggestion region 418B.

As shown in FIG. 4C, keyboard module 122 of computing device 110 may receive additional indications of taps or gestures at keys 418A and continue to determine, based on the user input, text that computing device 110 formats and displays within edit region 416C. For example, as the user types "playin" after typing "sure whats" keyboard module 122 of computing device 110 may cause edit region 416C to display "playin". In addition, as the user types at graphical keys 418A, keyboard module 122 of computing device 110 may predict one or more candidate words based on the user input and display one or more of the candidate words within suggestion region 418B. For example, as shown in FIG. 4C, computing device 110 may present "playin", "playing", and "playtime" as suggested words culled from a lexicon in suggestion region 418B. In response to detecting a selection of a suggested word in suggestion region 418B, and further after detecting a selection of the "send key" of graphical keys 418A, computing device 110 may compose and send an electronic message that includes the text "sure what's playing" to the computing device associate with the friend. As shown in FIG. 4D, computing device 110 may output the content of the electronic message for display within output region 416A.

After the user finishes typing text associated with an electronic communication, keyboard module 122 of computing device 110 may automatically infer that the user is finished typing and in response, predict one or more search queries that may interest a user of computing device 110 for composing additional text associated with the electronic conversation the user is having with the friend. For example, keyboard module 122 of computing device 110 may determine the search query in response to determining an end of the text associated with an electronic communication by at least determining that a last key of a selection of one or more keys 418A corresponds to a punctuation key associated with a punctuation character. In other words, keyboard module 122 may predict a search query associated with text in response to determining that a final character in the text is a punctuation character (e.g., '?', '.', '!', or some other punctuation character). In other examples, keyboard module 122 of computing device 110 may determine the search query in response to determining an end of the text associated with an electronic communication by at least determining that a last key of a selection of one or more keys corresponds 418A to a send key of the graphical keyboard to send the electronic communication. In other words, keyboard module 122 may predict a search query associated with text in response to determining that a final key selected by a user is the "send key" or "return key" that when selected, triggers the chat application of computing device 110 to send a message.

In response to determining and end of the text or otherwise inferring that the user has finished composing at least a portion of the content of an electronic communication, keyboard module 122 may enter search mode and predict a search query that may be relevant to the text. In the example of FIG. 4D, keyboard module 122 may analyze the text "sure what's playing" and determine that the phrase "what's playing" is a trigger phrase for referring to movies, specifically, movies being presented in movie theatres. Keyboard module 122 may automatically associate a curated phrase "movies playing near me" to text whenever keyboard module 122 identifies the trigger phrase "what's playing". In addition, to attain further confidence that the user is referring to "movies" and not "plays" or other productions, keyboard module 122 may analyze the content of the text within the current context of computing device 110. That is, the current context of computing device 110 includes a previously received message in which includes text "movie". Keyboard module 122 may increase a score associated with the curated phrase "movies playing near me" in response to determining previous messages referenced "movies" and generate a query for conducting a search of "movies playing near me" to identify various movies playing near a current location of computing device 110.

In some examples, computing device 110 may modify a visual format of a search key from the plurality of keys to indicate that the computing device generated the search query. For example, as shown in FIG. 4D, search element 418C has changed from being displayed in a first visual format in which search element 418C has a first color pallet, to a second visual format in which search element 418C is displayed having a second color pallet. In other examples, computing device 110 may cause search element 418C to flash, move, change size, or be altered in some other way in which to alert a user that computing device 110 auto-generated a search query based on text input at graphical keyboard 416B.

In some examples, computing device 110 may indicate that the computing device generated the search query by outputting text of the generated query. For example, as shown in FIG. 4D, computing device 110 may output the text of an auto-generated search query as a suggestion within suggestion region 418B of graphical keyboard 416B. As shown in FIG. 4D, the search query, when displayed within suggestion region 418B, is displayed in and amongst, linguistic, candidate words or phrases (e.g., non-search related suggestions).

In some examples, computing device 110 may display text of a search query within a separate search region of the graphical keyboard. The search region may be different than a suggestion region 418B of graphical keyboard 416B in which suggested words for text entry are displayed. For example, the search region may be positioned between graphical keys 418A and suggestion region 418C or the search region may be positioned between edit region 416C or output region 416A and suggestion region 418B. In some examples, computing device 110 may even replace suggestion region 418B with the search region.

After displaying a suggested query, computing device 110 may receive an indication of a selection of the graphical indication, and responsive to receiving the indication of the selection of the graphical indication, computing device 110 may execute, based on the search query, a search for information. For example, as shown in FIG. 4D, keyboard module 122 may receive an indication of user input detected at a location at which the search query "movies playing near me" is displayed within suggestion region 418B. Responsive to receiving the indication of the user input, keyboard module 122 may execute a search based on the selected query.

Figure 4E:
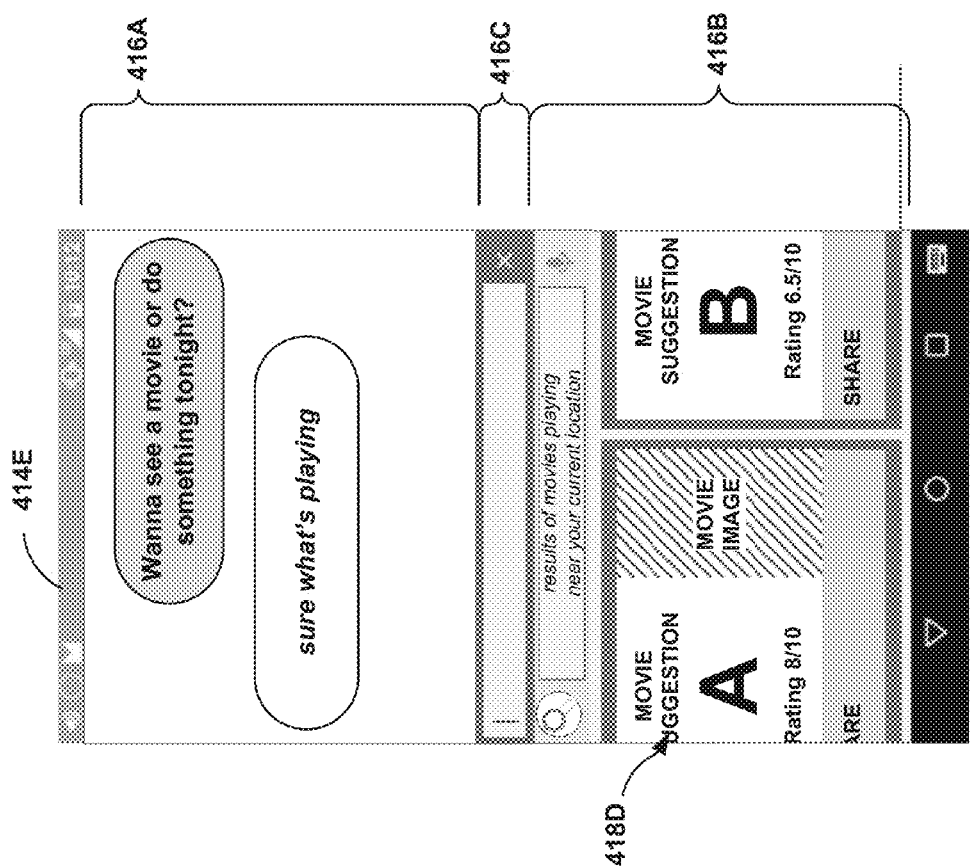

After executing the search for information, computing device 110 may output, for display, by replacing at least a portion of the plurality of keys 418A of graphical keyboard 416B, a graphical indication of one or more search results obtained by the search. For example, as shown in FIG. 4E, keyboard module 122 may obtain search results based on the selected query and format the search results into individual search cards 418D that keyboard module 122 causes computing device 110 to display as overlays atop graphical keys 418A. In the example, of FIG. 4D, search cards 418D are presented in a carousel format such that a user may swipe left or right to move to a subsequent search results or may drag a search result from the carousel into an edit region 416C or output region 416A. In some examples, a user may further present a search box in addition to search cards 418D so that a user can execute subsequent searches. In this way, keyboard module 122 conveniently presents an auto-generated search query within graphical keyboard 416B which, after being selected, causes computing device 110 to present search results directly within graphical keyboard 416B.

Figure 5:
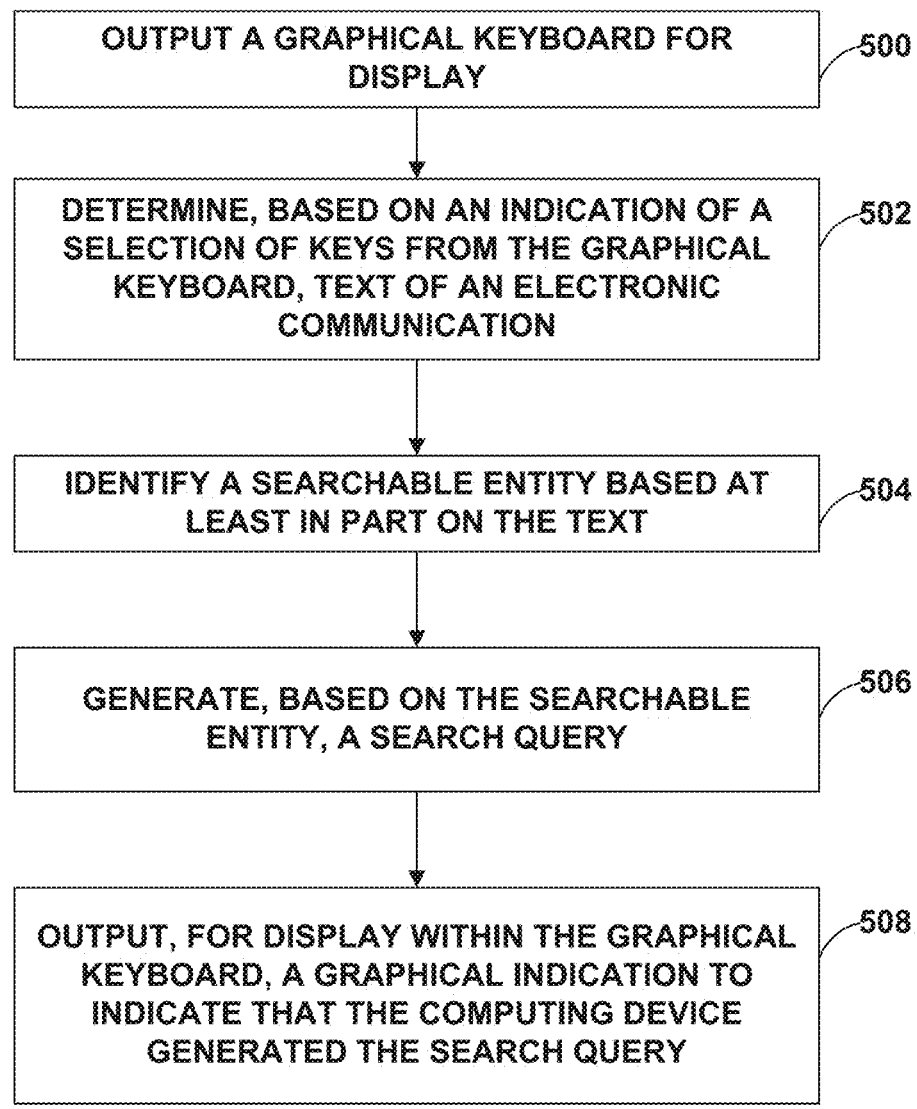
FIG. 5 is a flowchart illustrating example operations of a computing device that is configured to present a graphical keyboard with integrated search features, in accordance with one or more aspects of the present disclosure.

FIG. 5 is a flowchart illustrating example operations of a computing device that is configured to present a graphical keyboard with integrated search features, in accordance with one or more aspects of the present disclosure. The operations of FIG. 5 may be performed by one or more processors of a computing device, such as computing devices 110 of FIG. 1 or computing device 210 of FIG. 2. For purposes of illustration only, FIG. 5 is described below within the context of computing device 110 of FIG. 1.

In operation, computing device 110 may output a graphical keyboard for display (500). For example, a chat application executing at computing device 110 may invoke keyboard module 122 (e.g., a standalone application or function of computing device 110 that is separate from the chat application) to present graphical keyboard 116B at PSD 112.

Computing device 110 may determine, based on an indication of a selection of keys from the graphical keyboard, text of an electronic communication (502). For example, keyboard module 122 may receive information about touch inputs detected at a location of PSD 112 at which graphical keys 118A of graphical keyboard 116B are being displayed. Keyboard module 122 may determine text (e.g., "what's with the president's hair") based on the information.

Computing device 110 may identify a searchable entity based at least in part on the text (504). For example, a global model of keyboard module 122 may infer from the portion of the text input "the president" that a user is conversing about the President of the United States (e.g., "Barak Obama").

Computing device 110 may generate, based on the searchable entity, a search query (506). For example, keyboard module 122 may generate a search query for obtaining news about the President of the United States as a keyword search for "Barak Obama news".

Computing device 110 may output, for display within the graphical keyboard, a graphical indication to indicate that computing device 110 generated the search query (508). For example, keyboard module 122 may cause computing device 110 to present text of the generated query within graphical keyboard 116B (e.g., as a suggestion within suggestion region 118B).

Figure 6:
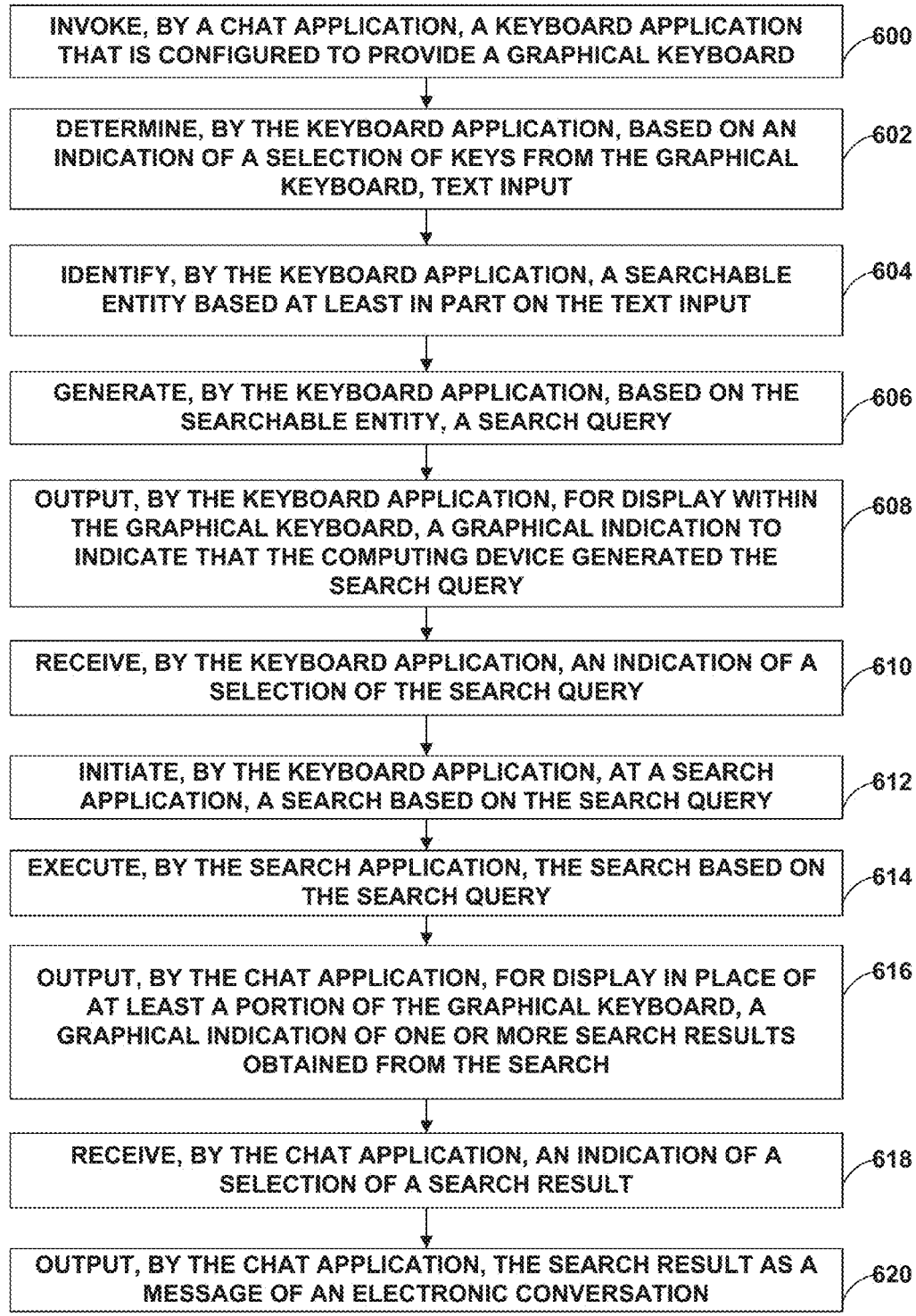
FIG. 6 is a flowchart illustrating example operations of a computing device that is configured to present a graphical keyboard with integrated search features, in accordance with one or more aspects of the present disclosure.

FIG. 6 is a flowchart illustrating example operations of a computing device that is configured to present a graphical keyboard with integrated search features, in accordance with one or more aspects of the present disclosure. The operations of FIG. 6 may be performed by one or more processors of a computing device, such as computing devices 110 of FIG. 1 or computing device 210 of FIG. 2. For purposes of illustration only, FIG. 6 is described below within the context of computing device 210 of FIG. 2.

In operation, a first application executing at computing device 210 may invoke, for receiving text input, a keyboard application that is configured to provide a graphical keyboard comprising a plurality of keys (600). For example, application module 224 may be a chat application that provides an instant messaging or chat application user interface at PSD 212 for exchanging electronic messages in electronic conversations between a user of computing device 210 and users of other computing devices. As part of the chat application user interface, application module 224 may call on keyboard module 222 to provide graphical keyboard 116B. Application module 224 may send a command to keyboard module 222 invoking keyboard module 222 (e.g., as an application or service executing at computing device 210 that is different from application module 224).

Once invoked, the keyboard application may determine, based on an indication of a selection of one or more keys from the plurality of keys, the text input (602). For example, once invoked, keyboard module 222 may receive an indication of user input at a location at which one or more keys 118A are displayed at PSD 212 and infer from the user input, text.

The keyboard application may identify, based at least in part on the text input, a searchable entity (604). For example, keyboard module 222 may rely on local and/or global models 232 and machine learned model 233 to identify one or more searchable entities from the text input, as well as searchable entities from prior text input detected by keyboard module 222.

The keyboard application may generate, based on the searchable entity, a search query (606). For example, keyboard module 222 may format and package one or more of the searchable entities identified from the text input into a search query format used by a search engine executing at or remote to computing device 210 for obtaining information about the search entities.

The keyboard application may output, for display within the graphical keyboard, a graphical indication to indicate that the keyboard application generated the search query (608). For example, after generating the search query, keyboard module 222 may cause PSD 212 to present the query (e.g., as text) either replacing or in addition to other word suggestions, at suggestion region 118B.

The keyboard application may receive an indication of a selection of the search query (610). For example, keyboard module 222 may receive information from UI module 220 indicating that a user of computing device 220 selected (e.g., by gesturing) at or near a location of PSD 212 at which the search query was being displayed and infer from the information that the user selected the query.

Responsive to receiving the indication of the selection, the keyboard application may initiate, at a search application, a search based on the search query (612). For example, keyboard module 222 may call on a separate search application to execute a local information search of information stored at computing device 220 or a remote information search (e.g., by calling on a search application that is executing at a remote computing device such as a server) of information stored remote to computing device 220, based on the search query.

The search application may execute the search based on the search query (614). For example, the search application called on by keyboard module 222 may execute the search based on the search query as an on-device search for search results associated with information stored locally at computing device 210. The search application called on by keyboard module 222 may execute the search based on the search query as a remote search for search results associated with information stored remote to computing device 210. In any case, the chat application may receive, via the keyboard application and from the search application, one or more search results obtained from execution of the search.

The chat application may output, for display in place of at least a portion of the graphical keyboard, a graphical indication of one or more search results obtained by the keyboard application after the keyboard application initiates the search (616). For example, application module 224 may package the search results obtained from the search into a carousel of search cards that application module 224 may cause keyboard module 122 to overlay in front of or present in-place of, at PSD 212, some or all of graphical keys 118A.

The chat application may receive an indication of a selection of a search result (618). For example, application module 224 may receive information from UI module 220 indicating that a user of computing device 210 swiped or otherwise gestured at or near a location at which one of the search results was being displayed within graphical keyboard 116B at PSD 212.

Responsive to receiving the indication of the selection of at least one of the one or more search results, the chat application may output the search result as a message of the electronic conversation (620). For example, in response to detecting the user input to select a search result, application module 224 may format the information associated with the search result into a message format and output the formatted information as part of a, or as an entire, message that application module 224 outputs to a different computing device as part of an electronic conversation between a user of computing device 210 and a user of the different computing device.

The following numbered clauses may illustrate one or more aspects of the disclosure:

Clause 1. A method comprising: outputting, by a keyboard application executing at a computing device, for display, a graphical keyboard comprising a plurality of keys; determining, by the keyboard application, based on an indication of a selection of one or more keys from the plurality of keys, text of an electronic communication; identifying, by the keyboard application, based at least in part on the text, a searchable entity; generating, by the keyboard application, based on the searchable entity, a search query; and outputting, by the keyboard application, for display within the graphical keyboard, a graphical indication to indicate that the keyboard application generated the search query.

Clause 2. The method of clause 1, wherein the search query is determined in response to determining an end of the text, the method further comprising: determining, by the keyboard application, the end of the text in response to determining that a last key of the selection of one or more keys corresponds to a punctuation key associated with a punctuation character.

Clause 3. The method of any one of clauses 1-2, wherein the search query is determined in response to determining an end of the text, the method further comprising: determining, by the keyboard application, the end of the text in response to determining that a last key of the selection of one or more keys corresponds to a send key of the graphical keyboard to send the electronic communication.

Clause 4. The method of any one of clauses 1-3, wherein outputting the graphical indication comprises modifying a visual format of a search key from the plurality of keys to indicate that the computing device generated the search query.

Clause 5. The method of any one of clauses 1-4, wherein the graphical indication comprises text of the search query, and outputting the graphical indication comprises outputting the text of the search query as a suggestion within a suggestion region of the graphical keyboard.

Clause 6. The method of any one of clauses 1-5, wherein the graphical indication comprises text of the search query, and outputting the graphical indication comprises outputting, for display within a search region of the graphical keyboard, the text of the search query as a suggested query for searching, the search region being different than a suggestion region of the graphical keyboard in which suggested words for text entry are displayed.

Clause 7. The method of clause 6, wherein outputting the graphical indication comprises replacing, by the computing device, the suggestion region with the search region.

Clause 8. The method of any one of clauses 1-7, wherein identifying the searchable entity comprises: determining, by the keyboard application, based on at least a portion of the text, one or more words; determining, by the keyboard application, based on the one or more words and from a local model of searchable entities, a score assigned to the searchable entity indicating a probability that the searchable entity is relevant to the one or more words, the local model being associated with a current location of the computing device; responsive to determining the score assigned to the searchable entity satisfies a threshold, identifying, by the keyboard application, the searchable entity.

Clause 9. The method of clause 8, wherein the local model is a first local model, the method further comprising: responsive to determining a change in the current location of the computing device from a first location to a second location: obtaining, by the keyboard application, from a remote computing system, a second model of searchable entities, the second model being associated with the second location; and replacing, by the keyboard application, the first local model with the second model.

Clause 10. The method of any one of clauses 1-9, wherein identifying the searchable entity comprises: determining, by the keyboard application, based on at least a portion of the text, one or more words; determining, by the keyboard application, based on the one or more words and from a global model of searchable entities, a score assigned to the searchable entity indicating a probability that the searchable entity is relevant to the one or more words, the global model being associated with a geographical region that includes respective locations associated with two or more models of searchable entities; and responsive to determining the score assigned to the searchable entity satisfies a threshold, identifying, by the computing device, the searchable entity.

Clause 11. The method of any one of clauses 1-10, wherein identifying the searchable entity comprises: determining, by the keyboard application, based on at least a portion of the text, one or more words; determining, by the keyboard application, based on the one or more words and from at least one of a global model of searchable entities or a local model of searchable entities, a score assigned to the searchable entity indicating a probability that the searchable entity is relevant to the one or more words, the global model being associated with a geographical region that includes respective locations associated with two different local models of searchable entities including the local model of searchable entities; modifying, by the keyboard application, based on contextual information and from a machine learned model, the score assigned to the searchable entity; and after modifying the score assigned to the searchable entity and responsive to determining the score assigned to the searchable entity satisfies a threshold, identifying, by the keyboard application, the searchable entity.

Clause 12. The method of clause 11, wherein the contextual information includes information associated with an electronic conversation that includes the electronic communication and one or more other electronic communications that have been sent or received by the computing device.

Clause 13. The method of any one of clauses 1-12, wherein generating the search query comprises: determining, by the keyboard application, based at least in part on the searchable entity, a curated phrase associated with the searchable entity; and generating, by the keyboard application, from the curated phrase, the search query, wherein the searchable entity comprises a trigger phrase, and wherein the curated phrase associated with the searchable entity is further determined based at least in part on a current context of the computing device.

Clause 14. A mobile device comprising: a presence-sensitive display component; at least one processor; and a memory that stores instructions associated with a keyboard application that when executed cause the at least one processor to: output, for display at the presence-sensitive display component, a graphical keyboard comprising a plurality of keys; determine, based on an indication of a selection of one or more keys from the plurality of keys detected at the presence-sensitive display component, text of an electronic communication; identify, based at least in part on the text, a trigger phrase; generate, based on the trigger phrase, a search query; and output, for display, at the presence-sensitive display component and within the graphical keyboard, a graphical indication to indicate that the computing device generated the search query.

Clause 15. A method comprising: invoking, by a first application executing at a computing device, for receiving text input, a keyboard application that is configured to provide a graphical keyboard comprising a plurality of keys; determining, by the keyboard application, based on an indication of a selection of one or more keys from the plurality of keys, the text input; identifying, by the keyboard application, based at least in part on the text input, a searchable entity; generating, by the keyboard application, based on the searchable entity, a search query;

outputting, by the keyboard application, for display within the graphical keyboard, a graphical indication to indicate that the keyboard application generated the search query; and responsive to receiving, by the keyboard application, an indication of a selection of the search query, initiating, by the keyboard application, at a search application, a search based on the search query.

Clause 16. The method of clause 15, wherein the search application is executing at the computing device, the method further comprising: executing, by the search application, the search based on the search query as a on-device search for search results associated with information stored locally at the computing device.

Clause 17. The method of any one of clauses 15-16, wherein the search application is executing at a remote computing device, the method further comprising: executing, by the search application, the search based on the search query as a remote search for search results associated with information stored remote to the computing device.

Clause 18. The method of any one of clauses 15-17, wherein the first application is a chat application and the text input is associated with an electronic conversation within the chat application.

Clause 19. The method of clause 18, further comprising: outputting, by the first application, for display in place of at least a portion of the plurality of keys, a graphical indication of one or more search results obtained by the keyboard application after the keyboard application initiates the search.

Clause 20. The method of clause 19, further comprising: responsive to receiving, by the first application, an indication of a selection of at least one of the one or more search results, outputting, by the chat application, the at least one of the one or more search results as a message of the electronic conversation.

Clause 21. A system comprising means for performing any of the methods of clauses 1-13.

Clause 22. A computing device comprising means for performing any of the methods of clauses 1-13.

Clause 22. A computer-readable storage medium comprising instructions that, when executed by at least one processor of a computing device, cause the at least one processor to perform any of the methods of clauses 1-13.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a keyboard application executing at a computing device, for display, a graphical keyboard comprising a plurality of keys and a suggestion region in which suggested words for text entry are displayed;
   determining, by the keyboard application, based on an indication of a selection of one or more keys from the plurality of keys, text;
   generating, by the keyboard application, based at least in part on the text, a search query; and
   outputting, by the keyboard application, for display within a search region of the graphical keyboard that replaces the suggestion region of the graphical keyboard, a graphical indication to that indicates the keyboard application generated the search query, wherein the graphical indication includes text of the search query as a suggested query for searching.

2. The method of claim 1, wherein outputting the graphical indication comprises modifying a visual format of a search key from the plurality of keys that indicates the computing device generated the search query.

3. The method of claim 1, wherein generating the search query comprises generating a plurality of search queries including the search query.

4. The method of claim 3, wherein the graphical indication further includes text of one or more other search queries from the plurality of search queries, and outputting the graphical indication comprises outputting, for display within the search region, the text of the one or more other search queries.

5. A mobile device comprising:
   a presence-sensitive display component;
   at least one processor; and
   a memory that stores instructions associated with a keyboard application that when executed cause the at least one processor to:
      output, for display at the presence-sensitive display component, a graphical keyboard comprising a plurality of keys and a suggestion region in which suggested words for text entry are displayed;
      determine, based on an indication of a selection of one or more keys from the plurality of keys detected at the presence-sensitive display component, text of an electronic communication;
      generate, based at least in part on the text, a search query; and
      output, for display, at the presence-sensitive display component and a search region of the graphical keyboard that replaces the suggestion region of the graphical keyboard, a graphical indication that indicates the keyboard application generated the search query, wherein the graphical indication includes text of the search query as a suggested query for searching.

6. The mobile device of claim 5, wherein the instructions, when executed, cause the at least one processor to output the graphical indication by at least modifying a visual format of a search key from the plurality of keys to indicate that the computing device generated the search query.

7. The mobile device of claim 5, wherein the instructions, when executed, cause the at least one processor to generate the search query by at least generating a plurality of search queries including the search query.

8. The mobile device of claim 5, wherein the graphical indication further includes text of one or more other search queries from the plurality of search queries, and the instructions, when executed, cause the at least one processor to output the graphical indication by at least outputting, within the search region, the text of the one or more other search queries.

9. A method comprising:
   invoking, by a first application executing at a computing device, for receiving text input, a keyboard application that is configured to provide a graphical keyboard comprising a plurality of keys and a suggestion region in which suggested words for text entry are displayed;
   determining, by the keyboard application, based on an indication of a selection of one or more keys from the plurality of keys, the text input;
   generating, by the keyboard application, based at least in part on the text input, a search query;
   outputting, by the keyboard application, for display within a search region of the graphical keyboard that replaces the suggestion region of the graphical keyboard, a graphical indication that indicates the keyboard application generated the search query, wherein the graphical indication includes text of the search query as a suggested query for searching; and
   responsive to receiving, by the keyboard application, an indication of a selection of the search query, initiating, by the keyboard application, at a search application, a search based on the search query.

10. The method of claim 9, wherein the search application is executing at the computing device, the method further comprising:

executing, by the search application, the search based on the search query as an on-device search for search results associated with information stored locally at the computing device.

11. The method of claim 9, wherein the search application is executing at a remote computing device, the method further comprising:

executing, by the search application, the search based on the search query as a remote search for search results associated with information stored remote to the computing device.

12. The method of claim 9, wherein the first application is a chat application and the text input is associated with a conversation within the chat application.

13. The method of claim 12, further comprising:

outputting, by the first application, for display in place of at least a portion of the plurality of keys, a graphical indication of one or more search results obtained by the keyboard application after the keyboard application initiates the search.

14. The method of claim 13, further comprising:

responsive to receiving, by the first application, an indication of a selection of at least one of the one or more search results, outputting, by the chat application, the at least one of the one or more search results as a message of the conversation.

15. The method of claim 2, wherein modifying the visual format of the search key comprises changing the search key from being displayed in a first visual format to a second visual format.

16. The method of claim 15, wherein the first visual format has a first color pallet and the second visual format has a second color pallet that is different than the first color pallet.

17. The method of claim 15, wherein the first visual format has a first size and the second visual format has a second size that is different than the first size.

18. The method of claim 2, wherein modifying the visual format of the search key comprises causing the search key to flash, move, or change size.

19. The mobile device of claim 6, wherein the instructions, when executed, cause the at least one processor to modify the visual format of the search key by at least changing the search key from being displayed in a first visual format to a second visual format, wherein at least one of:

the first visual format has a first color pallet and the second visual format has a second color pallet that is different than the first color pallet; or the first visual format has a first size and the second visual format has a second size that is different than the first size.

20. The mobile device of claim 6, wherein the instructions, when executed, cause the at least one processor to modify the visual format of the search key by at least causing the search key to flash, move, or change size.

* * * * *